United States Patent

[11] 3,625,454

[72] Inventors Johan Van Der Maaden; Huibert Engel Van Lit, both of Emmasingel, Eindhoven, Netherlands

[21] Appl. No. 800,429

[22] Filed Feb. 19, 1969

[45] Patented Dec. 7, 1971

[73] Assignee U.S. Philips Corporation New York, N.Y.

[32] Priorities Feb. 23, 1968

[33] Netherlands

[31] 6802575;

Dec. 21, 1968, Netherlands, No. 6818489

[54] TAPE CARTRIDGE DEVICE

2 Claims, 5 Drawing Figs.

[52] U.S. Cl. .......... 242/180, 242/200

[51] Int. Cl. .......... G11b 23/10

[50] Field of Search .......... 242/198, 180, 199, 181, 200, 197, 71.2, 71.1; 352/31, 72, 78; 274/4, 11; 179/100.22

[56] References Cited

UNITED STATES PATENTS

| | | | |
|---|---|---|---|
| 1,933,797 | 11/1933 | Fritts | 242/71.2 |
| 2,123,495 | 7/1938 | Becker | 352/78 |
| 2,511,344 | 6/1950 | Kaylor et al. | 242/180 |
| 2,633,305 | 3/1953 | Kaylor | 242/180 |
| 3,272,325 | 9/1966 | Schoenmakers | 206/52 F |

*Primary Examiner*—George F. Mautz

*Attorney*—Frank R. Trifari

ABSTRACT: A tape cartridge device having two separate tape storing and carrier compartments, each compartment being provided with tape carrier means such as winding and unwinding cores. The separate compartments are disengageable one from the other and connected as by a hinge so that one of the compartments may be pivoted to a desired angle with respect to the other compartment. One of the tape carrier compartments is arranged for storing and playback of acoustical signals, while the other compartment is arranged for storing and playback and/or recording of optical signals such as on video tape or film. The separate compartments or tape magazines may be provided with means to synchronize the playback and/or recording of the tape carried in each of the separate compartments. The hinged magazine arrangement is particularly suitable for use in an audio-visual recording and/or playback device.

INVENTORS
JOHAN VAN DER MAADEN
HUIBERT ENGEL VAN LIT
BY
Frank R. Trifari
AGENT

INVENTORS
JOHAN VAN DER MAADEN
HUIBERT ENGEL VAN LIT
BY
AGENT

PATENTED DEC 7 1971

3,625,454

INVENTORS
JOHAN VAN DER MAADEN
HUIBERT ENGEL VAN LIT
BY
Frank R. Trifari
AGENT

TAPE CARTRIDGE DEVICE

The invention relates to a readily engageable and disengageable magazine for use in a device for recording and/or playing back acoustical and optical signals, if desired, simultaneously on or from a tape-shaped carrier each. Such devices are known in the art, however, they have the disadvantage that both the carrier for the acoustical part (sound) and the carrier for the optical part (for example, a picture film) have to be engaged and disengaged separately so that storing is a source of trouble and disorder is likely to occur. The assembly of the parts is not a simple operation. This disadvantage is completely obviated, when, in accordance with the invention, the magazine of the kind set forth comprises two box-shaped portions, each portion comprising in known manner both a winding-up core and a winding-off core and one or more openings in one or more sidewalls, through which the signals can be recorded or played back on or from the tape-shaped carrier. The tape-shaped carrier of one portion is capable of recording and/or playing back solely acoustical signals, whereas the tape-shaped carrier of the second portion is capable of recording and/or playing back solely optical signals, both portions being pivotally linked to each other so that one portion is capable of turning through an angle of 180° at the most with respect to the other portion. The lower and upper faces of each portion may be at an angle to each other, while in the folded state the upper and lower faces of the magazine extend parallel to each other. Both for aesthetical and manufacturing reasons it is preferable to arrange the lower and upper faces of the two portions so as to be parallel to each other, as is the case in one embodiment of the invention.

The cores of the magazine portions may be driven in various ways. In one embodiment of the invention one portion is provided with means by which one or both winding cores of the second portion can be driven, when one or both cores of said portion are driven. These means may be formed by a (tiltable) shaft, which can be inserted into a coupling of the second portion, when the magazine is open. As an alternative bevel gear wheels or other gear wheels may be employed.

In a further embodiment of the invention the two portions may each be provided with two openings, the axes of which are at right angles to at least the lower face of the portion, said openings accommodating rotatable cores on which the tape windings are detachably arranged. In this case the openings in the cores can receive shafts capable of driving the carriers via the cores.

This embodiment of the invention is simple and cheap and drivings may be independent of each other, which may sometimes provide given advantages.

A suitable embodiment of the invention consists in that the pivotal connection of the two magazine portions comprises a box-shaped auxiliary hinge element rotatably and detachably connected with the magazine portion intended for recording and/or playing back optical signals, whereas the magazine portion intended for recording and/or playing back acoustical signals is inserted into the auxiliary hinge element and locked therein. This construction has the advantage that for the acoustical magazine portion a standardized sound magazine can be employed, which does not require special precautions for forming a pivotally connected unit with the optical magazine portion.

The invention furthermore relates to an auxiliary hinge element for use in a magazine in accordance with the invention, which is characterized in that the auxiliary hinge element is formed by a box-shaped casing bounded by four orthogonal sidewalls and accommodating at least one resilient lug for locking the magazine portion for recording and/or playing back acoustical signals, said casing having stop means for limiting the insertion of said magazine portion, while two opposite sidewalls are provided with an outwardly projecting pivot pin, which is resiliently movable substantially in its longitudinal direction and is adapted to cooperate with a recess provided in the magazine portion for recording and/or playing back optical signals.

In a suitable embodiment of an auxiliary hinge element in accordance with the invention said element is made of a synthetic resin and is provided with at least one internal tine serving as a locking lug on a sidewall adjacent a face having a pivotal pin, said tine being resiliently movable by providing partial incisions at least in the wall provided with the tine, while the movability of the pivotal pins is obtained by partial incisions of the adjacent sidewalls.

The invention will be described with reference to the drawing, which shows some embodiments of the invention and in which FIG. 1 shows a magazine comprising two portions and opened up through an angle of 180°, and FIG. 2 shows the magazine of FIG. 1 in the closed state;

Figure 1:
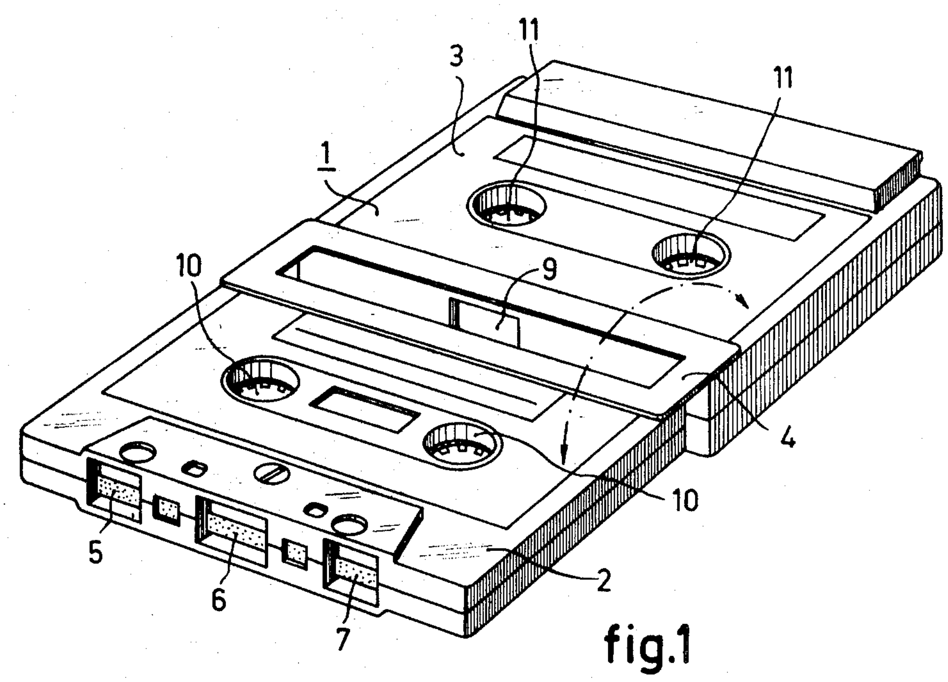

Referring to the Figures, reference numeral 1 designates a magazine comprising two portions 2 and 3, which are interconnected by a strip 4 of elastic synthetic resin. The portion 2 comprises a tape covered with magnetizable material, provided in known manner with a sound record and a winding-up core and winding-off core by which the tape is moved along windows 5, 6 and 7, at which in operation, for example, playback heads, guide rollers and the like may be arranged.

The portion 3 also comprises two cores on which and from which a tape covered with light-sensitive material is wound. The tape is passed along a window 8; a source of light (not shown), passing the light, for example, through an opening 9, can project the picture through the window 8, along a shutter mechanism, if any, and through object lenses to the outside. The portion 2 has openings 10, accommodating cores on which the carrier is wound; the cores are adapted to rotate in said openings 10. The same applies to the portion 3 having winding cores. When the magazine is employed in an appropriate apparatus, these openings 10 and 11 receive shafts that can be driven.

Figure 2:
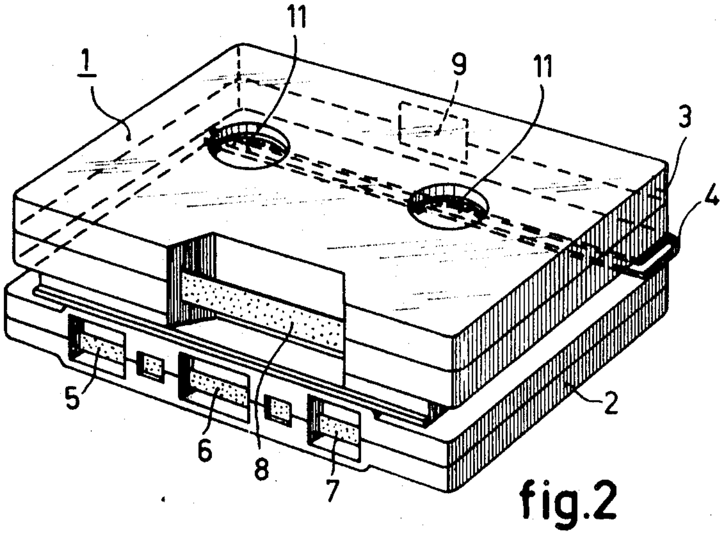

In the embodiment shown the upper faces of the portions 2 and 3 are parallel to each other; as an alternative, these upper faces may be at an angle to the lower faces, which angles are preferably chosen so that in the closed state shown in FIG. 2 the resultant upper and lower faces of the magazine are parallel to each other.

As an alternative only the portion 2 or the portion 3 may have openings 10 or 11, through which driving shafts can be taken, while the cores in the other portion are driven, for example, by interengaging gear wheels or other members transmitting the rotary movement in the opened state. In this case synchronization between sound and picture, if desired, is simple. However, synchronization may, as an alternative, be carrier out electrically, for example, by means of a synchronizing track on the sound carrier. The pivotal part 4 may be formed by a conventional pivot or a so-called piano hinge; the construction used here has, however, the advantage that it is slightly resilient so that the tolerances especially with respect to the disposition on the shafts of the apparatus may be greater. Moreover, with respect to the arrangement of the magazine in the apparatus this resilience is advantageous.

Figure 3:
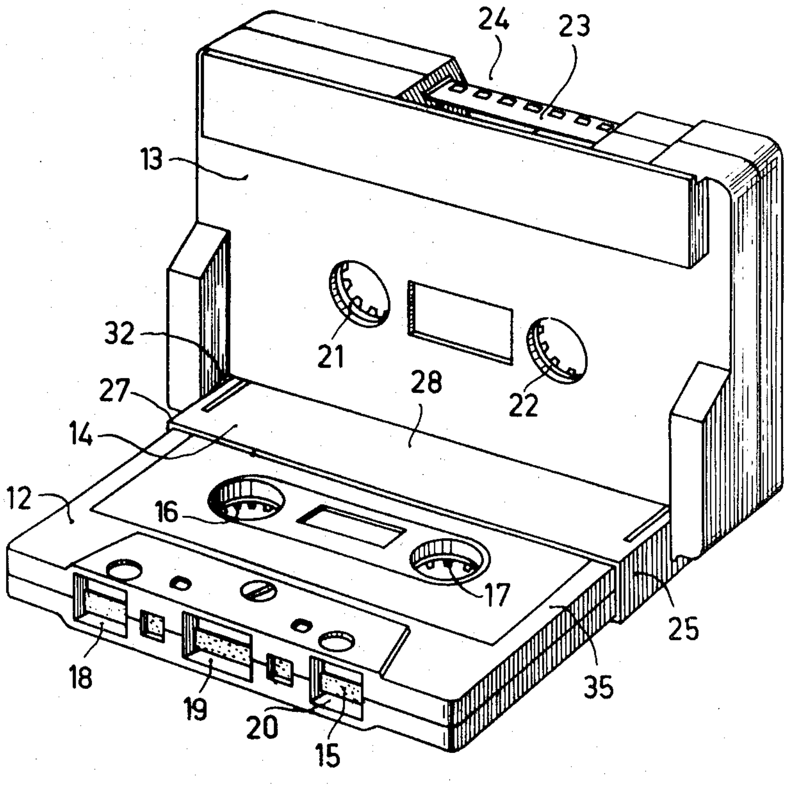
FIG. 3 shows a modified magazine consisting of two pivotally interconnected portions, opened through 90°, embodying the invention.

As is shown in FIG. 3, a magazine comprises two box-shaped portions 12, 13, pivotally interconnected by means of a box-shaped preferably plastics auxiliary hinge element 14. The portion 12, which will be termed the sound magazine, comprises a tape 15 coated with magnetizable material and provided in known manner with sound records, and winding-up and winding-off tape cores by means of which the tape can be moved past openings 18, 19, 20, in which playback heads, guide rollers and the like of a suitable recording/playback apparatus (not shown) can be arranged.

The portion 13, which will be termed hereinafter the film magazine portion, also comprises two cores 21, 22 for winding on and off a tape 23, coated with light-sensitive material and moved past a projection window 24. The winding-off and winding-on cores of the two magazine portions can be driven by arranging the cores on driving shafts of the recording/playback apparatus.

The auxiliary hinge element 14 is rotatably and detachably connected with the film magazine portion 13, while the sound magazine portion 12 is slipped into the said element and locked therein.

Figure 4:
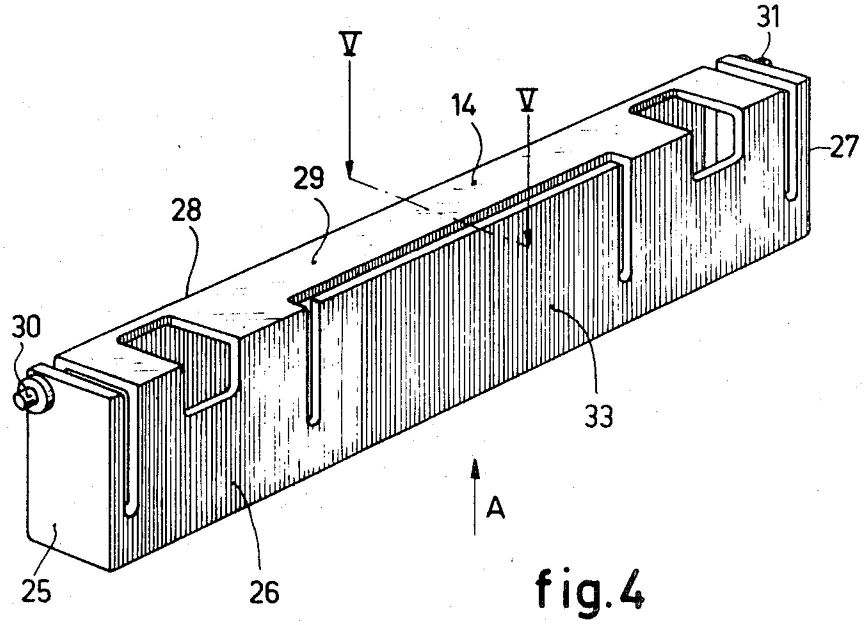
FIG. 4 shows an auxiliary hinge element for use in the magazine of FIG. 3.

As will be apparent particularly from FIG. 4, the auxiliary hinge element is formed by a box-shaped casing bounded by four orthogonal sidewalls 25, 26, 27 and 28. The casing is provided with stop means 29, forming in this embodiment a bottom of the casing for limiting the insertion of the sound magazine portion 12 in the direction of the arrow A in FIG. 4. The two opposite sidewalls 25 and 27 are provided each with an outwardly projecting pivotal pin 30, 31, adapted to cooperate with appropriate recesses 32 (FIG. 3) provided in the film magazine portion 13. The pivotal pins 30, 31 are resiliently movable substantially in their longitudinal direction, since the adjacent faces 26, 29 and 28 have partial incisions. This movability of the pivotal pins is utilized for the rotatable and detachable connection of the hinge element with the film magazine portion.

Figure 5:
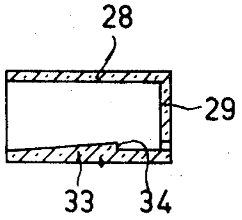
FIG. 5 is a cross sectional view of the auxiliary hinge element taken on the line V—V in FIG. 4.

A portion 33 of the sidewall 26 adjacent the sidewall 25, 27 provided with pivotal pins is provided with a tine 34 (FIG. 5) projecting inside the casing and gripping behind a portion (not shown) of a raised magazine rim provided all around (35 in FIG. 3) for locking the sound magazine portion in place. The sidewall portion 33 with the tine 34 has the structure of a resilient tag, since the sidewall 26 and the bottom face 29 have partial incisions.

After the hinge element is coupled in said manner with the film magazine portion, the sound magazine portion can be inserted, while the tine 34 snaps behind the raised rim of said magazine portion, which is thus locked in place.

If desired, the sound magazine portion may be removed by lifting the movable tag 33, so that the lock is released.

It should be noted that the invention is not restricted to the embodiment described in the foregoing and illustrated in the drawing. The invention also comprises, for example an embodiment in which at least the sidewall 26 is enlarged and the locking tine 34 for fixing the sound magazine portion is replaced by two internal, partially annular extensions, also provided on the resilient tag 33, which are capable of cooperating with the two openings of the sound magazine portion accommodating the cores 16, 17.

We claim:

1. A tape cartridge device for use in audio-visual recording and/or playback apparatus comprising a first compartment for carrying therein a tape carrier for recording and/or playing back acoustical signals, said compartment having an upper face, a lower face and four sidewalls joining said faces, said first compartment having a wind-up core and a wind-off core rotatably mounted therein for transporting said tape therebetween, a pair of openings extending transversely through the upper and lower faces of said compartment the axes thereof arranged at right angles to at least said lower face, said openings arranged for accommodating spindle means of a recording apparatus which will engage said cores, a plurality of openings in at least one of the sidewalls of said compartment for providing access to the tape carriers for means to drive the tape and for means to playback or record acoustical signals thereon, a second compartment connected to the first compartment for carrying therein a tape carrier for playing back or recording optical signals, said second compartment having upper and lower faces and four sidewalls joining said faces, one or more openings in a sidewall thereof for providing access to the tape for means for playing back or recording the optical signals on the tape carrier and for providing means therethrough for driving said tape carrier, a pair of cores rotatably mounted within said compartment for carrying therebetween said optical tape carrier, a pair of openings in said second carrier and extending through the faces of the compartment for accommodating therein said cores and for receiving therethrough spindle means of a tape player device, said openings having their axes arranged at right angles to at least the lower face of said compartment, and means for linking said first compartment with said second compartment so that one compartment may be placed at an angle of as much as 180° with respect to the other compartment when in an operative position so that said compartments may be placed in a recording apparatus and whereby said angle may be 0° so that the upper faces of both of said compartments are adjacent one another so that the compartments may be stored together.

2. The cartridge device according to claim 1 wherein said linking means for pivotally connecting said compartments comprises a strip of elastic synthetic resin material.

* * * * *